R. E. HELLMUND.
PHASE CONVERTER SYSTEM.
APPLICATION FILED APR. 4, 1916.

1,335,108.

Patented Mar. 30, 1920.

WITNESSES:

INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

PHASE-CONVERTER SYSTEM.

1,335,108.  Specification of Letters Patent.  Patented Mar. 30, 1920.

Application filed April 4, 1916. Serial No. 88,795.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Phase-Converter Systems, of which the following is a specification.

My invention relates to phase-converter systems, and it has for its object to provide systems of the character designated wherein the phase converter may be caused to operate at synchronous speed; whereby power factor adjustment and stable operation are assured by the use of simple and inexpensive circuit connections which are not liable to become deranged.

Figure 1:
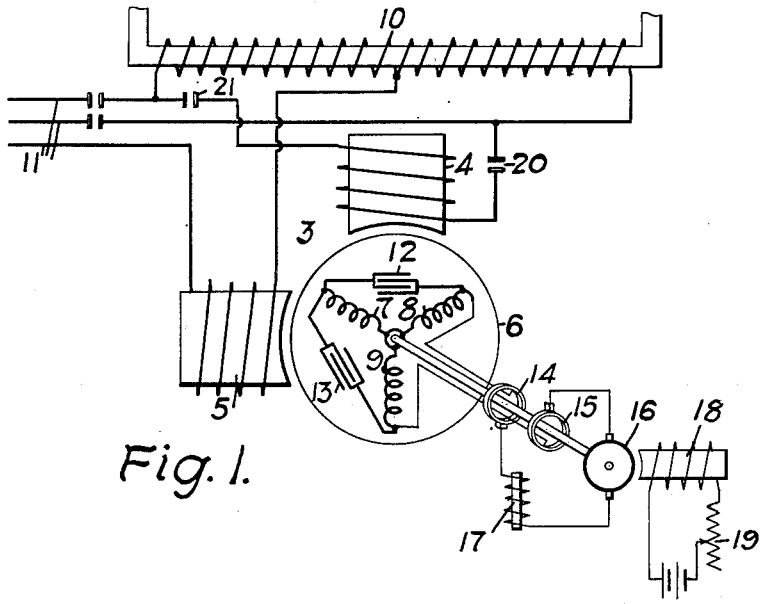
Figure 2:
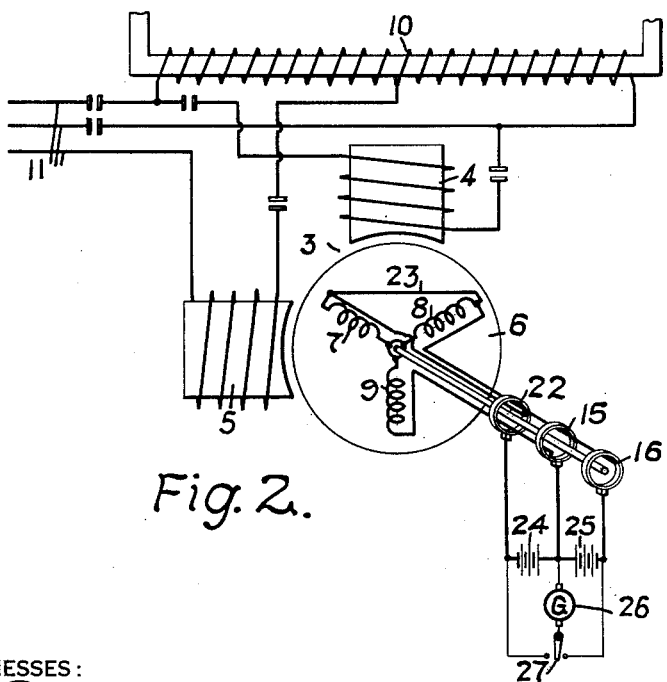

In the accompanying drawing, Figure 1 is a diagrammatic view of a phase converter of the synchronous type, together with its attendant supply and control systems, embodying a preferred form of my invention; and Fig. 2 is a diagrammatic view of a modification of the system shown in Fig. 1.

In the operation of phase converters, more particularly those of the single-phase induction motor type, it has been proposed to supply direct current to an exciting winding on the rotor, whereby definite magnetic poles are established thereon, resulting in synchronous operation. Having provided exciting means of this character, one may vary the power factor of the phase converter and, incidently, of the system as a whole, by varying the amount of direct-current excitation in a manner analogous to the operation of the well known synchronous condenser. Another advantage of synchronous-converter operation resides in the fact that the speed of the rotor does not decrease with an increasing load and thus the voltage of the secondary or inducing stator winding is not as seriously affected by changes in the load as is the secondary voltage of a phase converter of the simple induction type. As a result, the voltages of the resultant polyphase alternating-current circuit remain nearly balanced and harmful distortion is avoided.

By the present invention, I provide means whereby alternating load current and direct excitation current flow in the same rotor winding but whereby said currents are forced to take different paths exterior to said winding, whereby the necessity of employing a specially designed auxiliary machine is avoided and, at the same time, equally effective results are obtained. Furthermore, by preventing the passage of load current through the auxiliary machine, a much smaller auxiliary machine may be employed.

Referring to the accompanying drawing for a more detailed understanding of my invention, I show a phase converter of the induction type at 3 in Fig. 1. Said phase converter embodies a primary stator winding 4, a secondary stator winding 5 mechanically displaced with respect to the winding 4 and a rotor 6 provided with a phase winding 7—8—9, the phase winding in this case being shown as of the three-phase star-connected type. The rotor 6 may or may not be provided with an additional squirrel-cage winding, as is found desirable. Energy for the operation of the phase converter 3 is derived from any suitable source, such, for example, as the secondary winding 10 of a transformer and the secondary winding 5 is shown as connected between the mid-point of the winding 10 and one of the output mains 11 in accordance with the well known Scott or T connection, employed in this case to produce three-phase current from the vectorial combination of the electromotive force of the winding 10 and the quadrature-related electromotive force of the winding 5, all as is well known and understood in the art. The outer ends of the phases 7 and 8 and 7 and 9 of the rotor winding are respectively connected through condensers 12 and 13. In addition thereto, the outer ends of the phases 8 and 9 are connected to suitable slip rings 14 and 15 on the shaft of the phase converter and said slip rings are connected across the brushes of a direct-current generator 16 through a choke coil 17. The main field excitation 18 of the generator 16 may be varied in strength by a suitable rheostat 19. The generator 16 is shown as having its rotor mounted upon the shaft of the phase converter 6 for convenience in driving but any other driving means may be employed therefor if found desirable.

Having thus described the structure of a phase converter embodying my invention, the operation is as follows: At the outset, the phase converter is brought up to substantially synchronous speed, either by employing the machine 16 as a starting motor or by the use of a separate starting motor or other driving means and the primary stator winding 4 is connected to the source 10 by the closure of suitable switches 20 and 21. As synchronous speed is approached, a single-phase induction motor torque is developed within the rotor 6 and the services of the starting means may be dispensed with. Under these conditions, the working currents in the rotor 6 circulate through the phases 7, 8 and 9 and find a closed return circuit through the condensers 12 and 13. Alternating current from the phases 8 and 9, seeking to find a closed current path through the slip rings 14 and 15 and the armature 16, is greatly impeded by the choke coil 17. If now the voltage of the armature 16 is built up by adjustment of the rheostat 19, a direct current flows from the armature 16 through the choke coil 17, being but little impeded by the latter and thence, via the slip rings 14 and 15, through the phase windings 8 and 9. The result of said direct-current flow is to produce definite poles upon the face of the rotor 6 and thus to cause the latter to drop into step and to operate at synchronous speed with respect to the frequency of the flux of the stator winding 4. The attainment of synchronous speed by the rotor 6, of course, means that the frequency of the driving currents thereof at once fall to zero but the frequency of the alternating currents which are operating to induce an electromotive force in the winding 5 remains at double frequency, permitting flow thereof through the condensers 12 and 13. Thus, it will be seen that, in normal operation, the direct current which is supplying the field for the driving torque for the rotor 6 flows through the slip rings 14 and 15 and the phases 8 and 9, whereas the alternating working current flows through the phases 7, 8 and 9 and the condensers 12 and 13. Thus, certain portions of the rotor phase winding are simultaneously energized by both direct and alternating currents but the return circuits through which said currents complete their flow are separate and distinct. Were the condensers 12 and 13 eliminated, a short circuit available for direct-current flow would be placed across the phase windings 8 and 9 and thus no direct current flow could take place therein and, in like manner, were the inductive device 17 eliminated, the flow of alternating current from the phase windings 8 and 9 through the more or less inductive armature 16 would result in serious unbalancing of the electromotive forces within the rotor 6. Particular attention is directed to the fact that the double frequency of the alternating working current permits the use of relatively small condensers 12 and 13. Consequently, said condensers may be mounted on the rotor, as shown, if desired, although obviously they may be mounted exterior thereto and connected through slip rings. Not only do the condensers 12 and 13 permit alternating-current flow but, by their neutralizing effect upon the inductance of the windings 7, 8 and 9 they improve the power factor of the rotor and, consequently, improve the power factor and regulation of the machine as a whole.

Referring to the system shown in Fig. 2, the general arrangement of the phase converter 3 and its supply circuits is as indicated in Fig. 1. An additional slip ring 22 is provided and connected to the terminus of the phase winding 7. The outer terminals of the phase windings 7 and 8 are directly connected by a conductor 23 and batteries or other non-inductive direct-current sources 24 and 25 are connected across the slip rings 15, 22 and 16, respectively, said batteries thus being, in effect, connected across the terminals of the phase windings 7 and 9 and 9 and 8, respectively. The batteries 24 and 25 have like poles connected to the slip ring 15 so that the unidirectional potential of the outer terminæ of the phase windings 7 and 8 are substantially equal, and no direct-current flow takes place through the conductor 23. Direct-current does flow, however, from the batteries 24 and 25 through the slip rings 22 and 16 and thence through the phase windings 7 and 8, returning through the phase winding 9 to the slip ring 15. Thus, direct-current flows in all portions of the direct-current winding but does not flow in the conductor 23. The alternating currents generated in the phase windings 7, 8 and 9, on the other hand, circulate freely through the conductor 23 and through the batteries 24 and 25 which are essentially non-inductive in nature. Thus, an even better current distribution is obtained than in the circuit of Fig. 1; all portions of the rotor phase windings being jointly subject to direct and alternating current flow. A generator 26 may be provided if found desirable and may be floated across either of the batteries 24 or 25 by the operation of a suitable switch 37 in order to maintain the voltage of said batteries.

Throughout the above discussion, I have for purposes of simplicity spoken of the direct and alternating currents and electromotive forces as though these quantities maintained their distinct identities, but it will be understood that in the actual machine, these various factors are consolidated to produce pulsating unidirectional and unsymmetrical alternating currents or electromotive forces, as the case may be.

While I have shown my invention in two of its preferred forms, it will be obvious to those skilled in the art that it is susceptible of various minor changes and modifications without departing from the spirit thereof and I desire, therefore, that only such limitations shall be placed thereupon as are imposed by the prior art or indicated in the appended claims.

I claim as my invention:

1. The combination with a dynamo-electric machine provided with a working winding, of means for causing the simultaneous flow of direct current and of alternating current in said winding, means for providing distinct current paths for said two types of current exterior to said winding, means in one of said current paths for substantially preventing the flow of alternating-current therethrough, and means in the other of said current paths for substantially preventing the flow of direct-current therethrough.

2. The combination with a dynamo-electric machine provided with a stator winding and with a polyphase rotor winding, said machine being adapted to generate a polyphase electromotive force in said rotor winding, of means for providing closed paths for the phases of said winding, whereby polyphase alternating currents circulate therein, means for superposing a unidirectional electromotive force upon said alternating electromotive force, and means for preventing the resultant unidirectional current flow from following certain of said circuit closing paths.

3. The combination with a dynamo-electric machine provided with a plurality of stator windings of displaced phase relation and with a closed-circuit, phase wound rotor, of means for supplying alternating-current to one of said stator windings, whereby said rotor is caused to rotate and to generate an alternating electromotive force in another stator winding, and means for producing direct current flow in certain of the phases of said rotor winding and for preventing said direct current from flowing in certain of the closing circuits of said phase winding.

4. The combination with a dynamo-electric machine provided with a plurality of stator windings of displaced phase relation and with a rotor provided with a phase winding, of means for closing portions of said phase winding comprising devices whose preponderating reactance is capacitive, and means for bridging an external supply circuit across portions of said phase windings.

5. The combination with a dynamo-electric machine provided with a plurality of stator windings of displaced phase relation and with a rotor provided with a phase winding, of means for closing portions of said phase winding comprising devices whose preponderating reactance is capacitive, and means for bridging an external supply circuit across portions of said phase winding, said means including a highly inductive device for substantially preventing the flow of alternating current through said bridging circuit.

6. The combination with a dynamo-electric machine provided with a plurality of stator windings of displaced phase relation and with a rotor provided with a phase winding, of means for closing portions of said phase winding comprising devices whose preponderating reactance is capacitive, and means, including a highly inductive device, for bridging a direct-current supply circuit across a portion of said phase winding, whereby direct current is permitted to flow in said portions of said phase winding without flowing in the closing means thereof, and whereby alternating current is substantially prevented from flowing through said bridging circuit.

In testimony whereof I have hereunto subscribed my name this 25th day of March, 1916.

RUDOLF E. HELLMUND.